United States Patent Office 3,752,834
Patented Aug. 14, 1973

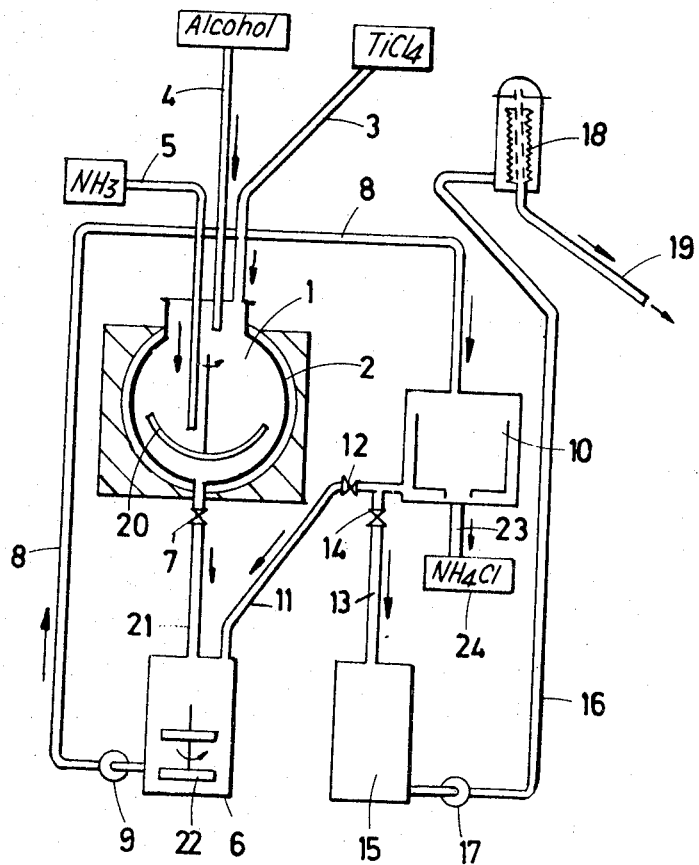

3,752,834
PROCESS FOR PREPARING ALKYL TITANATES FROM TITANIUM TETRACHLORIDE AND ALCOHOLS
Guy Marie Paul Bardinet, Thann, and Roger Emile Jules Keck, Cernay, France, assignors to Fabriques de Produits Chimiques de Thann et de Mulhouse, Thann, France
Filed Apr. 9, 1971, Ser. No. 132,722
Claims priority, application France, Apr. 17, 1970, 13,930
Int. Cl. C07f 7/28
U.S. Cl. 260—429.5                 6 Claims

ABSTRACT OF THE DISCLOSURE

Alkyl titanates are prepared by esterifying titanium tetrachloride with an alkanol and neutralizing the hydrochloric acid with ammonia in a process in which the pH of the reaction mixture is kept at about 4-6 until all the titanium tetrachloride has been introduced into the reactor and then continuing to introduce ammonia until pH of the reaction medium is about 9. This procedure facilitates removal of the precipitated ammonium chloride from the solution of alkyl titanate.

---

The present invention relates to a process for preparing alkyl titanates from titanium tetrachloride and alcohols.

Alkyl titanates such as isopropyl, propyl and butyl titanates have hitherto been prepared by esterification of titanium tetrachloride with an alcohol in slight excess, in an inert solvent, followed by neutralisation of the HCl formed in the reaction with ammonia to give ammonium chloride. The solid phase comprising ammonium chloride is then separated by filtration or centrifugation from the liquid phase comprising a mixture of alkyl titanate, inert solvent and excess alcohol. The filtrate or centrifuge liquor is then freed from inert solvent and excess alcohol by distillation and alkyl titanate is obtained rectification from the concentrate under reduced pressure.

The work which has led to the present invention has established that the manner in which the first two of these operations (esterification-neutralisation and centrifugation) are carried out influences the quality of the finished product, and also the economics of the process.

The present invention provides a process for the preparation of an alkyl titanate which comprises continuously introducing into an alkanol dissolved in a solvent (a) liquid titanium tetrachloride and (b) gaseous ammonia, the flow rates of the titanium tetrachloride and ammonia being so adjusted that the pH of the reaction mixture remains below 7 and, when the amount of titanium tetrachloride introduced corresponds stoichiometrically with the amount of alkanol present, introduction of titanium tetrachloride is stopped but introduction of ammonia is continued until all the hydrochloric acid, formed in the reaction between the alkanol and titanium tetrachloride, is neutralised to form ammonium chloride.

In this process the reaction mixture should remain slightly acidic e.g. pH 3-7 and it is preferred to maintain the reaction mixture at a pH between 4 and 6 during the introduction of the TiCl₄, the neutralisation by the continuous addition of gaseous ammonia then being continued until the pH is equal to about 9.

Benzene can be used as solvent on account of its price and on account of its low boiling point, which facilitates concentration of the final product. Other hydrocarbons, for example pentane, hexane, or petroleum ether fractions can, of course, also be used, provided that the price and volatility are acceptable. It is preferred to use hydrocarbon solvents having a B.P. below 90° C.

When it is desired to prepare isopropyl titanate, benzene is preferably used in combination with trichloroethylene, or other solvent which will lower the melting point of the liquid phase, for the following reason:

On account of the relatively high melting point of isopropyl titanate (+18° C.), the melting point of the reaction mass remains, throughout the operation, at between −4.5° and −6° C. As this mass becomes less and less fluid on account of the increasing formation of isopropyl titanate (which is more viscous than benzene) and, of solid ammonium chloride in suspension, considerable encrustation of the walls of the reactor occurs. This retards heat exchange with the cooling liquid very noticeably, and extends the duration of esterification-neutralisation.

On the other hand, if a part of the benzene is replaced by trichloroethylene, the melting point of the liquid phase varies according to the data in the following table.

| Percent by volume of trichloroethylene relative to benzene (total volume of solvent is constant) | Freezing point in ° C. during the operation | | |
|---|---|---|---|
| | At the beginning | In the middle | At the end |
| 10 | −7.5 | −8.5 | −9 |
| 15 | −10 | −11 | −12.5 |
| 20 | −15 | <−19 | <−19 |

The percentage of trichloroethylene is selected to be the minimum to avoid crust formation and will normally be in the range of 5–20% by volume, particularly 10–20% by volume. Tests show that a proportion between 10 and 15% by volume relative to benzene is sufficient in practice.

When alkyl titanates having low melting points are prepared, e.g. n-propyl or butyl titanate which melt at below −40° C., the problem mentioned above in connection with isopropyl titanate does not arise and it is not necessary to use a second solvent with the hydrocarbon.

A pH value of between 4 and 6 during the whole of the time the TiCl₄ is introduced is preferred because it is found, in industrial production, that the cake can be filtered or centrifuged much better if this value is adhered to.

The separation of the ammonium chloride is eventually carried out by true filtration, that is to say using, in place of the centrifugal force produced by the rapid rotation of a centrifuge bowl, the suction force of a vacuum pump.

The process of the invention may be carried out in apparatus illustrated diagrammatically in the accompanying drawing.

The apparatus comprises essentially reaction vessel 1, centrifuge 10, intermediate pot 6, filtrate vessel 15 and safety bag filter 18. Reaction vessel 1 has a cooled double wall 2 and is provided with stirrer 20, titanium tetrachloride inlet 3, alcohol inlet 4 and ammonia inlet 5. Reaction product is withdrawn from vessel 1 through valve 7 and line 21 to intermediate pot 6 provided with stirrer 22. The reaction product is pumped from pot 6 by pump 9 through line 8 to centrifuge 10. The centrifuged residue of ammonium chloride is taken through line 23 to receiver 24 while a supernatant liquid from centrifuge 10 can pass through valve 12 and recycle line 11 back to intermediate pot 6. An alternative route for the supernatant liquid from centrifuge 10 is provided through valve 14 and line 13 which are located on a spur on recycle line 11 upstream of valve 12 so that the route to be taken by the supernatant liquid can be controlled by operation of valves 12 and 14. Line 13 leads to titanate receiver 15 and from receiver 15 the titanate solution may be pumped by pump 17 through line 16 to safety bag filter 18 and line 19 to concentration and rectification means (not shown) where the alkyl titanate is recovered.

It is very important that the filtrate from the centrifuge should be free from solid particles of ammonium chloride in suspension. In fact, these latter particles, the proportion of which increases during concentration, are found in the final rectification chamber. The rectification distillate then contains a high proportion of chlorine, probably as a result of the formation of significant amounts of chlorinated derivatives of general formula $$Cl_n—Ti—(OR)_{(4-n)}$$

$n$ theoretically being equal to 1, 2 or 3, and R being an alkyl radical such as "$CH_3CH_2—$."

Now, in the centrifuging process it is known that the initial filtrate is always slightly cloudy until a layer of cake of sufficient thickness has formed. Moreover at the end of the operation, if it is desired to utilise the capacity of the bowl to the maximum, particles of solid are carried into the centrifuge liquor. This is most objectionable, since it is extremely difficult to control.

If an attempt is made to overcome these disadvantages, an almost continuous supervision is necessary. Even then, it is practically impossible for the centrifuge liquor not to show a fairly high turbidity. Under these conditions, there is the risk that the safety bag filter 18 through which the turbid liquor must pass before reaching the concentration apparatus will rapidly become filled, so that the previously described disadvantages will recur: the bag filter fills more rapidly than foreseen and, once it reaches its maximum capacity, lets the solid particles pass through, which leads to a costly repetition of the turbidity.

The problem of cloudy liquors may be controlled by a procedure wherein the reaction product containing precipitated ammonium chloride is centrifuged, the centrifuged residue washed and removed from the centrifuge, the supernatant liquid recycled for further centrifuging and the removal of the centrifuged residue from the centrifuge and recycling of the supernatant liquid for further centrifuging repeated until about 90% by weight of the total precipitated solids have been removed whereafter the supernatant liquid is subjected to a final centrifuging, and the final supernatant liquid, comprising a clear dilute solution of alkyl titanate separated.

The following examples are given to illustrate the invention.

EXAMPLE I

The esterification-neutralisation operation is carried out in apparatus as illustrated in the drawing having an enamelled or stainless steel reactor 1 provided with an efficient stirrer 20 and containing a double jacket 2 in which a cooling liquid circulates.

The alcohol (theoretical quantity plus 5% excess) and the inert solvent or solvents are introduced all at once into the reactor through the tube 4.

The liquid $TiCl_4$ and gaseous ammonia are then passed through lines 3 and 5 respectively, into this mixture.

The ratio of the flow rates in lines 3 and 5 is so regulated that, on the one hand, the temperature of the reaction mass is at most 20° C., and on the other hand the pH of the reaction mass stays between 4 and 6.

When all the $TiCl_4$ has been introduced, the neutralisation of the reaction mass is continued to pH 9, by continuing to bubble in gaseous ammonia for the necessary time. The reaction carried out is in this case the following:

$$TiCl_4 + 4NH_3 + 4ROH = Ti(OR)_4 + 4NH_4Cl$$

R being for example, an isopropyl, n-propyl or butyl radical.

While the centrifuge is being filled, via intermediate pot 6 the centrifuge liquor is continually returned to pot 6, the valve 12 being open and the valve 14 being closed, until the marked turbidity of the centrifuge liquor warns the operator (manual or automatic) that the centrifuge bowl is filled to the maximum. It is important to note in this respect that slowness of response by the operator (manual or automatic) is unimportant, since the cloudy liquors are recycled.

The charging of the centrifuge is stopped and the centrifuge, after the usual washing and centrifugal drying cycles, is emptied of its solid contents. It is then again ready for another cycle, for as many times as is necessary to remove about 90% of the solid phase present in the intermediate pot 6. When this is achieved, after a number of operations which is very easily determined experimentally, the contents of the pot 6 (mainly consisting of a liquid phase) are passed once again to the centrifuge and if the liquors which issue are sufficiently clear, valve 14 is opened and then valve 12 is closed, which allows clear dilute titanate to collect in receiver 15.

Safety filter 18 is kept in the circuit and is systematically cleaned after every 2,000 running hours, or even less often if experience shows it to be sufficient.

Finally, it should be pointed out that the prior separation, before centrifuging, of a clear layer which can easily be removed is obviously possible, taking advantage of the natural sedimentation of ammonium chloride. However, in industrial operation, this process cannot be employed because the very hard sediment can no longer be conveniently pumped.

The process can be carried out in the manner described above using benzene or benzene/trichloroethylene as solvent to prepare n-propyl or isopropyl titanate respectively.

The continuous daily production rose from an index of 100 to an index of 133 in an isopropyl titanate process operated by the same technicians, when 10% by volume of the benzene solvent was replaced by trichloroethlene. This result was due to the elimination of crust formation on the walls of the reactor 1, which allowed the duration of the esterification-neutralisation operation to be reduced in the ratio of 100/133. The index of isopropyl titanate production thus became equal to that for n-propyl titanate production, for which it is necessary to employ a mixed solvent.

EXAMPLE II

This example shows the benefit of maintaining the pH of the reaction mixture at 4–6 during the esterification step in accordance with the present invention as compared to maintaining it at 9–10 in accordance with prior art methods. Apart from this pH difference, the processes are carried out as described in Example I above.

In a first process carried out on an industrial scale, the pH of the reaction mass is continuously maintained at 9–10 by increasing the introduction ratio of the gaseous ammonia relative to that of the $TiCl_4$. The reaction mass preserves a very good fluidity during the whole of the duration of the operation. However, if it is desired to separate the ammonia chloride, it is found that filtration is practically impossible.

In the procedure according to the invention where all the other operating conditions are identical, the pH is maintained at between 4 and 6 by adjustment of the flow rate ratio of $TiCl_4$ and $NH_3$. The reaction mass is then less fluid and must be stirred more vigorously but the separation of the ammonium chloride by filtration takes place very easily.

EXAMPLE III

This example illustrates the value of the recycling process described above, for the flow of the reaction mass through the centrifuge.

In a first period of operation in a particular plant, the recycling process was not employed. The centrifuge liquor in this case contains an average amount of 2 to 3 g. of $ClNH_4$, per litre, despite normal supervision of the centrifuge. Consequently, the safety bag filter is completely filled after 7 to 8 days, and sometimes less, of continuous running. This necessitates frequent and costly cleaning of this bag filter. From time to time it even happens that ammonium chloride passes through the filter when it is too full, which necessitates costly reprocessing of the contaminated product.

After carrying out the recycling process to remove 90% of the solids before the final centrifuging, the ammonium chloride content is reduced to less than 0.01 g./litre. Cleaning the bag filter every three to four months (without the filter ever being completely full) is then sufficient to prevent any passage of ammonium chloride into the dilute titanate.

We claim:

1. A process for the preparation of an alkyl titanate which comprises continuously introducing into an alkanol dissolved in a solvent (a) liquid titanium tetrachloride and (b) gaseous ammonia, the flow rates of the titanium tetrachloride and ammonia being so adjusted that the pH of the reaction mixture remains below 7 and, when the amount of titanium tetrachloride introduced corresponds stoichiometrically with the amount of alkanol present, introduction of titanium tetrachloride is stopped but introduction of ammonia is continued until all the hydrochloride acid, formed in the reaction between the alkanol and titanium tetrachloride, is neutralised to form ammonium chloride.

2. A process according to claim 1 wherein the pH of the reaction mixture is maitained at 4–6 during introduction of titanium tetrachloride and after introduction of titanium tetrachloride has stopped, ammonia is introduced until the pH of the reaction mixtuure reaches 9.

3. A process according to claim 1 wherein the alkanol is isopropanol and the solvent is a mixture of benzene and trichloroethylene containing 5–20% by volume trichlorethylene.

4. A process according to claim 3 wherein the solvent contains 10–20% by volume trichlorethylene.

5. A process according to claim 1 wherein the reaction product containing precipitated ammonium chloride is centrifuged, the centrifuged residue washed and removed from the centrifuge, the supernatant liquid recycled for further centrifuging and the removal of the centrifuged residue from the centrifuge and recycling of the supernatant liquid for further centrifuging repeated until about 90% by weight of the total precipitated solids have been removed whereafter the supernatant liquid is subjected to a final centrifuging, and the final supernatant liquid, comprising a clear dilute solution of alkyl titanate separated.

6. A process according to claim 1 wherein the alkanol is isopropanol, the solvent is benzene containing 10–15% by volume trichloroethylene, the pH of the reaction mixture is maintained at about 4–6 during the introduction of the titanium tetrachloride, the introduction of titanium tetrachloride is stopped, ammonia is introduced until the pH of the reaction mixture reaches about 9, the precipitated ammonium chloride is removed substantially completely from the reaction mixture and the resulting clear solution of isopropyl titanate recovered.

References Cited
UNITED STATES PATENTS

| | | | |
|---|---|---|---|
| 2,187,821 | 1/1940 | Nelles | 260—429.5 |
| 2,654,770 | 10/1953 | Herman | 260—429.5 |
| 2,655,523 | 10/1953 | Herman | 260—429.5 |
| 3,119,852 | 1/1964 | Gilsdorf | 260—429.5 |
| 3,268,566 | 8/1966 | Stanley | 260—429.5 |
| 3,539,604 | 11/1970 | Cohen et al. | 260—429.5 |
| 3,547,966 | 12/1970 | Marble | 260—429.5 |
| 3,306,918 | 2/1967 | Schenck | 260—429.5 |
| 2,684,972 | 7/1954 | Haslam | 260—429.5 |

FOREIGN PATENTS

| | | | |
|---|---|---|---|
| 722,055 | 1/1955 | Great Britain | 260—429.5 |

HELEN M. S. SNEED, Primary Examiner